May 1, 1973  B. N. TURMAN  3,730,834
GAS INJECTION SYSTEM FOR DUST CORE REACTOR
Filed May 4, 1971  2 Sheets-Sheet 1

INVENTOR.
BOBBY N. TURMAN
BY Harry A. Herbert Jr.
ATTORNEY
Richard J. Killore
AGENT May 1, 1973  B. N. TURMAN  3,730,834
GAS INJECTION SYSTEM FOR DUST CORE REACTOR
Filed May 4, 1971  2 Sheets-Sheet 2
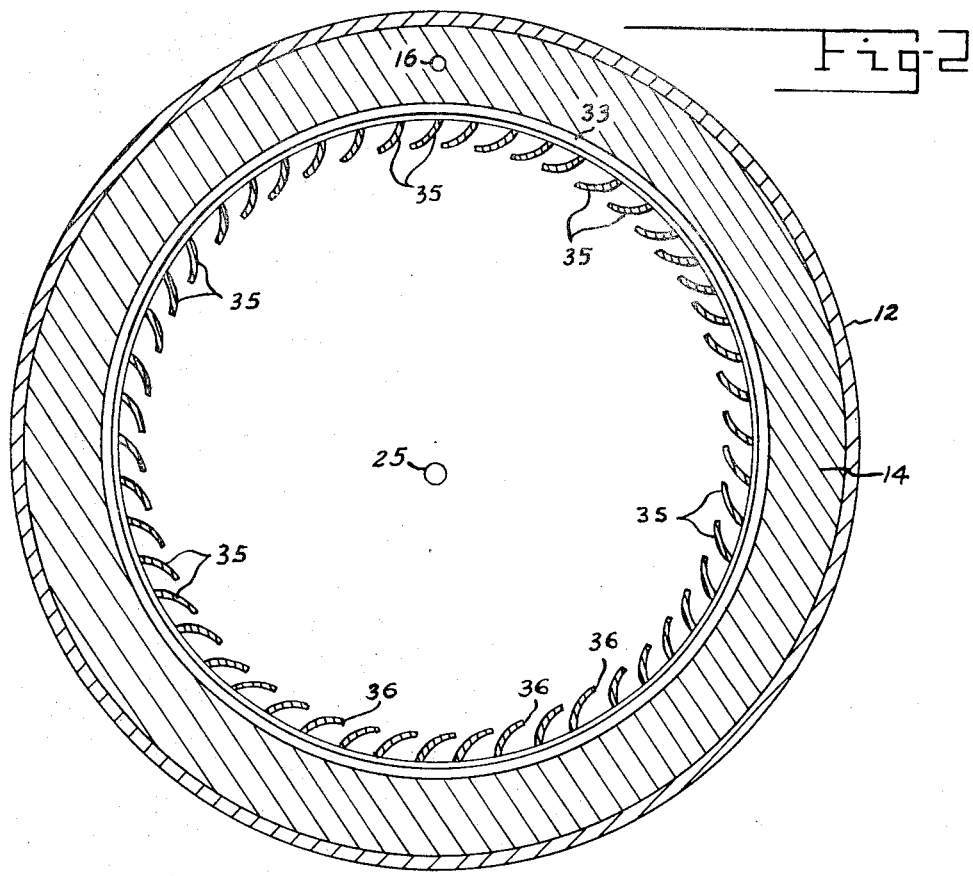
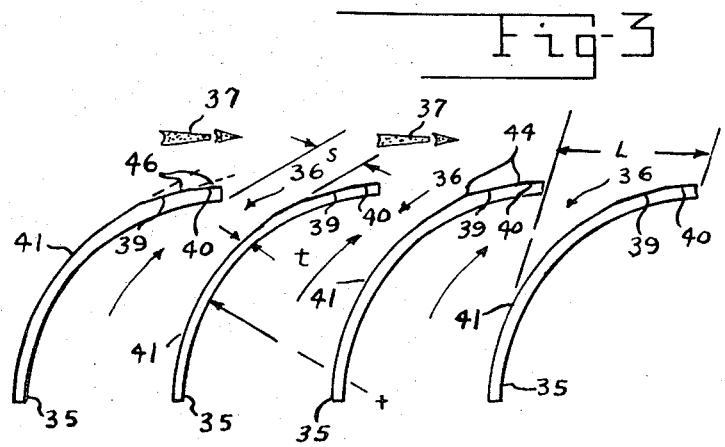
INVENTOR.
BOBBY N. TURMAN
BY Harry A. Herbert Jr.
ATTORNEY
Richard J. Killore
AGENT 3,730,834
GAS INJECTION SYSTEM FOR DUST
CORE REACTOR
Bobby N. Turman, Fairborn, Ohio, assignor to the United States of America as represented by the Secretary of the Air Force
Filed May 4, 1971, Ser. No. 140,177
Int. Cl. G21c 19/28
U.S. Cl. 176—45     1 Claim

ABSTRACT OF THE DISCLOSURE

A hydrogen gas injection system for a dust core reactor having a plurality of closely spaced thin arcuate vane sections positioned around the reactor cavity, with the spacing between the vanes being less than 10 times the slot width between the vanes. Each of the vanes have flat surfaces near the slots to enhance surface attachment of the gas jet.

BACKGROUND OF THE INVENTION

Basically the colloid core reactor concept is a method of generating nuclear power from a multi-component medium consisting of colloid-sized particles of nuclear fuel (in either the solid or liquid state) suspended in hydrogen gas. A vortex flow is used to separate fuel and hydrogen propellant gas, thus eliminating fuel loss from the system. Such a system is described in Von Ohain et al. application, Ser. No. 2,597 filed Jan. 13, 1970. When sufficient rotational velocity is given to the fuel particles, in such a system, to effect a high degree of particle separation, erosion of the peripheral walls of the vortex chamber, due to particle impact, becomes a serious problem. This erosion problem can be minimized, however, by proper design of the peripheral gas injection system.

BRIEF SUMMARY OF THE INVENTION

According to this invention, the erosion problem in a dust core reactor is minimized by a special design of the peripheral gas injection system. The gas injection system is made up of a large number of arcuate members spaced to form slots therebetween. The arcuate vane members have a thickness less than the slot width. The slot width is of the same order of magnitude as the vane length. Flat surfaces are provided on the vane members adjacent the slots to enhance surface attachment of the gas jets from the slots.

IN THE DRAWINGS

FIG. 2 is a reduced schematic view taken along the line 2—2 of FIG. 1.

FIG. 3 is an enlarged side view of a portion of the injection vanes for the device of FIG. 1.

DETAILED DECRIPTION OF THE INVENTION

Figure 1:
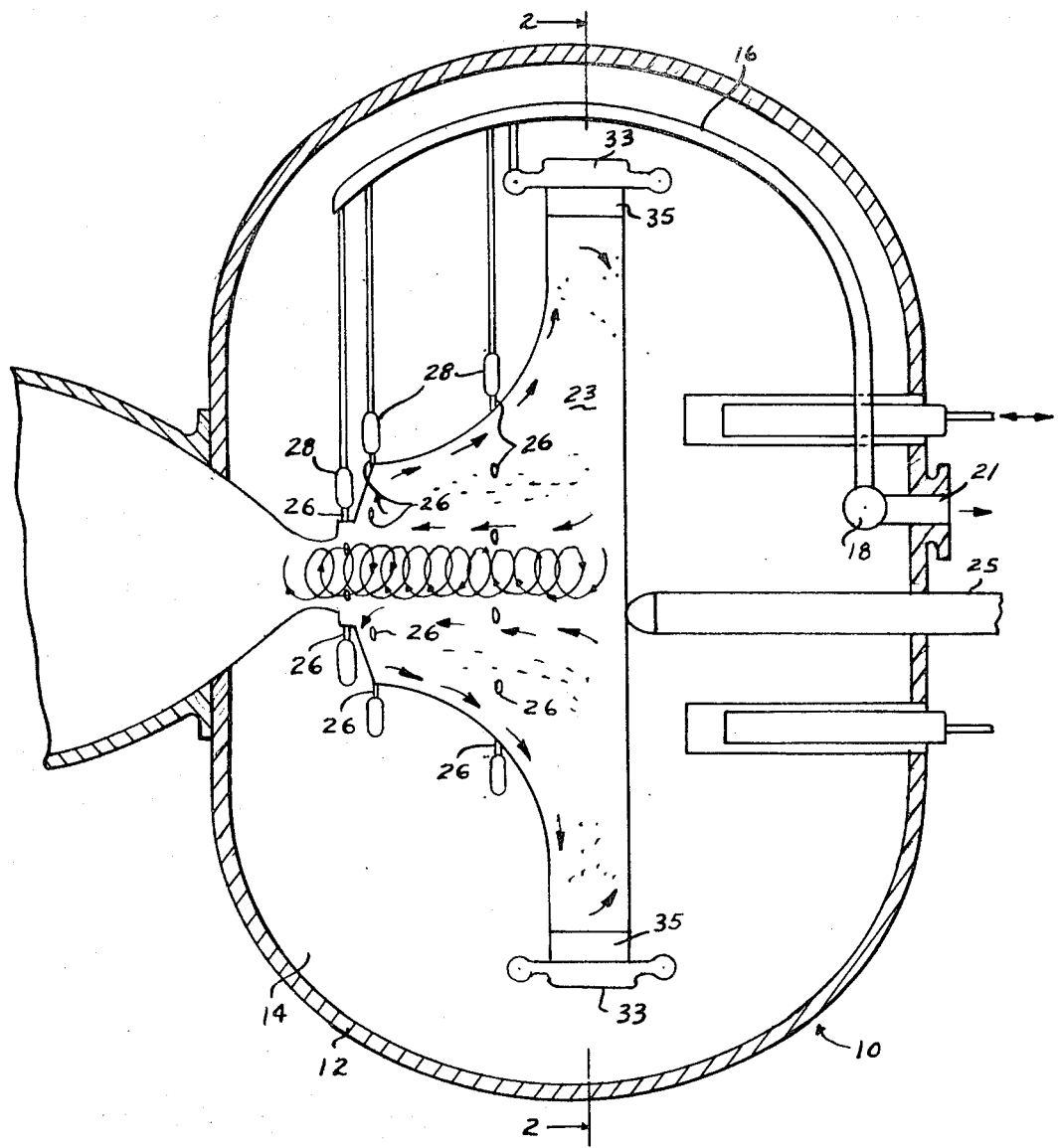
FIG. 1 is a partially cutaway schematic view illustrating an overall geometry for a reactor cavity using the peripheral gas injection apparatus of the invention.

With reference to FIG. 1 of the drawing, reference numeral 10 indicates generally a dust core reactor provided with an outer semispherical pressure shell 12. The shell 12 encloses a moderator body 14. A conventional regenerative cooling passage is shown schematically at 16 connected to an inlet manifold 18 adapted to be connected at 21 to a suitable high pressure liquid hydrogen supply, not shown.

A reactor cavity 23 is provided within the moderator body 14.

Reactive material may be supplied to the cavity through conduit 25. Nozzles 26 connected to annular manifolds 28 cool and protect the wall 30 from reactive particles.

According to this invention, hydrogen jets from the annular manifold 33 is supplied to the cavity 23 between a plurality of arcuate right cylindrical vane sections 35, shown in greater detail in FIGS. 2 and 3.

The arcuate vane sections 35 are made of thin sheets where the sheet thickness $t$ is much less than the slot width $S$, and arcuate vane length $L$, (the length of the arcuate vanes exposed to the flow of fuel and gas mixture indicated by arrows 37) is of the same order of magnitude as the slot width $S$, that is $L \leqq 10S$.

To enhance surface attachment of the fresh hydrogen gas in the gas jet from slots 36 to the exposed surfaces of arcuate vanes 35, flat surfaces 39 and 40 are provided on the outer cylindrical surfaces 41 of vanes 35. The flat surfaces 39 and 40 provide sharp edges 44 over which the jets must pass, thus leaving low pressure regions 46 which enhance the attachment of the hydrogen jets to exposed ends of surfaces 41.

In the operation of the device, hydrogen gas is supplied to annular manifolds 28 and 33 in the conventional manner to set up a vortex flow of gas within cavity 23. Shortly thereafter a critical amount of uranium, or of a uranium compound, is supplied through conduit 25 in a conventional manner. Because of the high spin velocity, due to the vortex action, the uranium particles are centrifuged radially outward toward vane sections 35. The hydrogen jets leaving slots 36 protect the exposed vane surfaces 41. Experiments have indicated that these vane surfaces, forming the peripheral wall of the cavity, are protected by the clear gas from the inlet slots over a distance up to 10 times the slot width. Therefore, if the slot separation, that is the arcuate length of the slot presented to the flow of nuclear particles, is less than ten times the slot width the erosion problem can be minimized.

There is thus provided a gas injection system for a colloid core reactor which substantially reduces the erosion problem.

I claim:

1. In a gas core nuclear reactor wherein a light gas is heated by diffusing it through a heavy fuel within an outer pressure shell enclosing a moderator body surrounding a central cavity forming a reactor chamber having a central axis; a nozzle connected to said chamber, with the axis of the nozzle lying along the central axis of said reactor chamber; means including said nozzle for providing a critical mass of fine nuclear particles within the chamber; means for providing a hydrogen gas vortex flow within said reactor chamber with the axis of rotation of the vortex flow lying along said central axis, said vortex flow of hydrogen gas causing vortex flow of said nuclear particles within said chamber; wherein said means for providing a vortex flow includes means for providing a tangential flow of hydrogen gas to the chamber comprising: a circumferential row of arcuate right cylindrical thin vane sections forming an annular manifold surrounding the chamber and having a common axis with said chamber; said arcuate vane sections being spaced apart to form slots therebetween and having a thickness less than the width of the slot between adjacent sections with the slot width being of the same order of magnitude as the arcuate length of the cylindrical vane sections exposed to the flow of fuel and gas mixture in the central cavity; said hydrogen gas being introduced into the spaces between the vane sections, said vane sections being shaped such that said hydrogen gas exits as jets from said spaces tangentially to said vane sections into said chamber; said outer exposed arcuate lengths of the cylindrical vane sections having flat portions for enhancing surface attachment of fresh hydrogen gas exiting from said slots to said exposed arcuate lengths, said flat portions having sharp edges at the ends thereof over which the jets pass, thus leaving low pressure regions which enhance the attachment of the hydrogen jets to the exposed arcuate lengths.

References Cited
UNITED STATES PATENTS

| | | | |
|---|---|---|---|
| 3,270,496 | 9/1966 | Rom | 176—39 |
| 3,546,069 | 12/1970 | McLafferty | 176—39 |
| 3,574,057 | 4/1971 | Rom | 176—45 |

HARVEY E. BEHREND, Primary Examiner

U.S. Cl. X.R.

60—203; 176—39